United States Patent
Alcocer Ochoa et al.

(10) Patent No.: US 9,983,680 B2
(45) Date of Patent: May 29, 2018

(54) GESTURE RECOGNITION MECHANISM

(71) Applicant: Intel Corporation, Santa Clara, CA (US)

(72) Inventors: Alberto Alcocer Ochoa, Zapopan (MX); David Arditti Ilitzky, Guadalajara (MX); Hector A. Cordourier Maruri, Guadalajara (MX); Jose R. Camacho Perez, Tlajomulco de Zuniga (MX)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 14/665,536

(22) Filed: Mar. 23, 2015

(65) Prior Publication Data

US 2016/0282945 A1 Sep. 29, 2016

(51) Int. Cl.
*G06F 3/01* (2006.01)

(52) U.S. Cl.
CPC .................................... *G06F 3/017* (2013.01)

(58) Field of Classification Search
CPC ........... G06F 3/014; G06F 3/015; G06F 3/017
See application file for complete search history.

(56) References Cited

U.S. PATENT DOCUMENTS

| 7,148,879 B2 | 12/2006 | Amento et al. | |
| 2003/0091134 A1* | 5/2003 | Chi | H04L 1/06 375/350 |
| 2007/0064535 A1* | 3/2007 | Burnstad | G01V 1/36 367/73 |
| 2012/0007713 A1* | 1/2012 | Nasiri | G06F 1/1694 340/5.81 |
| 2012/0256821 A1 | 10/2012 | Olsson et al. | |
| 2012/0306745 A1 | 12/2012 | Moore et al. | |
| 2014/0176439 A1 | 6/2014 | Keller et al. | |

FOREIGN PATENT DOCUMENTS

WO WO2011-094366 8/2011

OTHER PUBLICATIONS

"The Sound of One Hand: A Wrist-Mounted Bio-Acoustic Fingertip Gesture Interface" Amento et al., pp. 724-725, Apr. 20-25, 2002.
PCT Search Report and Written Opinion, PCT/US2016/017413, 17 pages, dated Jul. 6, 2016.
Office Action for U.S. Appl. No. 14/749,960 dated Nov. 16, 2016, 16 pages.
Final Office Action for U.S. Appl. No. 14/749,960 dated Jun. 1, 2017, 18 pages.

* cited by examiner

*Primary Examiner* — Kenneth Bukowski
(74) *Attorney, Agent, or Firm* — Womble Bond Dickinson (US) LLP

(57) ABSTRACT

A method is described including performing gestural training to extract training signals representing a gesture from each sensor in a sensor array, storing the training signals for each signal corresponding to the gesture in a library, receiving real time signals from the sensor array and comparing the real time output signals to corresponding training signals within the library to determine if a gesture has been recognized.

15 Claims, 7 Drawing Sheets

GESTURE RECOGNITION MECHANISM

FIELD

Embodiments described herein generally relate to wearable computing. More particularly, embodiments relate to identifying gestures using a wearable device.

BACKGROUND

Modern clothing and other wearable accessories may incorporate computing or other advanced electronic technologies. Such computing and/or advanced electronic technologies may be incorporated for various functional reasons or may be incorporated for purely aesthetic reasons. Such clothing and other wearable accessories are generally referred to as "wearable technology" or "wearable computing devices."

Wearable devices often include Small Form Factor (SFF) devices, which are becoming prevalent for enabling users to accomplish various tasks while on the go. However, as SFF devices become smaller typical input/output (I/O) interfaces (e.g., keyboard and/or mouse) have become impractable. Thus, speech or gesture commands may be implemented to interact with SFF computing devices to overcome interface problems. A gesture is defined as any type of movement of part of the body (e.g., a hand, head, facial expression, etc.) to express an idea or meaning. Additionally, the way gestures are interpreted depend on transducers implemented to measure the gesture. Therefore a gesture being measured through a digital camera, piezoelectric transducer or several accelerometers will provide different signal representations. However when a new input mechanism to interface with SFF devices is introduced, new challenges arise since there is no initial information regarding how to interpret input signals from the device.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Embodiments may be embodied in systems, apparatuses, and methods for gesture recognition, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

Embodiments provide for a gesture recognition mechanism that implements a time domain methodology to perform gesture identification and recognition. In such an embodiment, the gesture recognition mechanism is unaware of either a particular gesture, or specifics regarding one or more device sensors, prior to interfacing with the device. In one embodiment, the gesture recognition mechanism includes a training mode that extracts noiseless output signals (training signals) representing a gesture whenever a new user or gesture is added. In one embodiment, the training signals are generated during activation of each of one or more of the sensors during the training mode. Subsequently, training signals for each sensor corresponding to each performed gesture is stored in a library for future gesture recognition. During operation of the gesture recognition mechanism, real time output signals received for each sensor are compared to corresponding training signals within the library to determine if a gesture has been recognized. In various embodiments, the gesture recognition mechanism is integrated into a wearable device.

Figure 1:
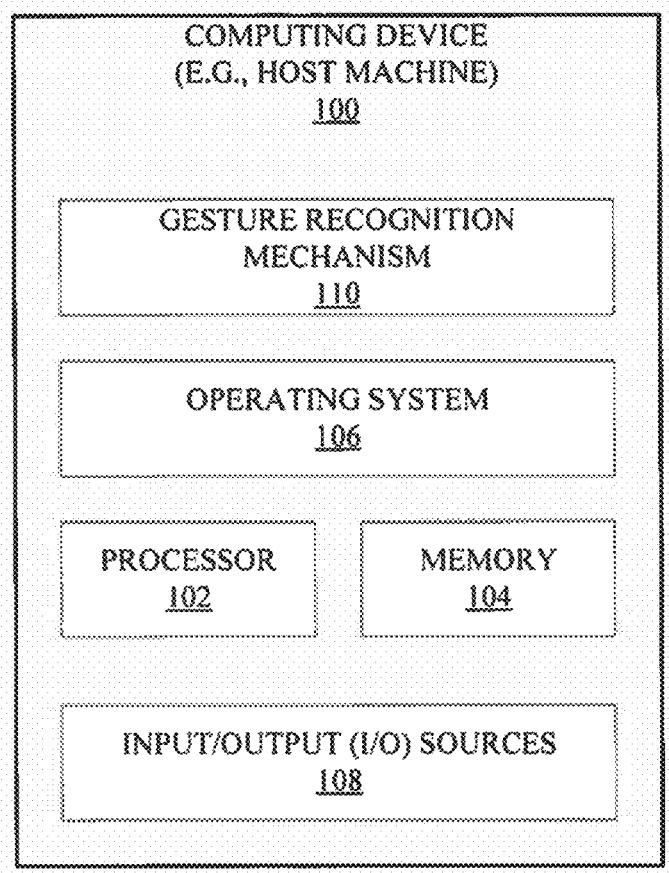
FIG. 1 illustrates a gesture recognition mechanism at a computing device according to one embodiment.

FIG. 1 illustrates a gesture recognition mechanism 110 at a computing device 100 according to one embodiment. In one embodiment, computing device 100 serves as a host machine for hosting gesture recognition mechanism ("recognition mechanism") 110 that includes a combination of any number and type of components for facilitating dynamic identification of gestures at computing devices, such as computing device 100. In one embodiment, computing device 100 includes a wearable device. Thus, implementation of recognition mechanism 110 results in computing device 100 being an assistive device to identify gestures of a wearer of computing device 100.

In other embodiments, gesture recognition operations may be performed at a computing device 100 including large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc.

Computing device 100 may include an operating system (OS) 106 serving as an interface between hardware and/or physical resources of the computer device 100 and a user. Computing device 100 may further include one or more processors 102, memory devices 104, network devices, drivers, or the like, as well as input/output (I/O) sources 108, such as touchscreens, touch panels, touch pads, virtual or regular keyboards, virtual or regular mice, etc.

Figure 2:
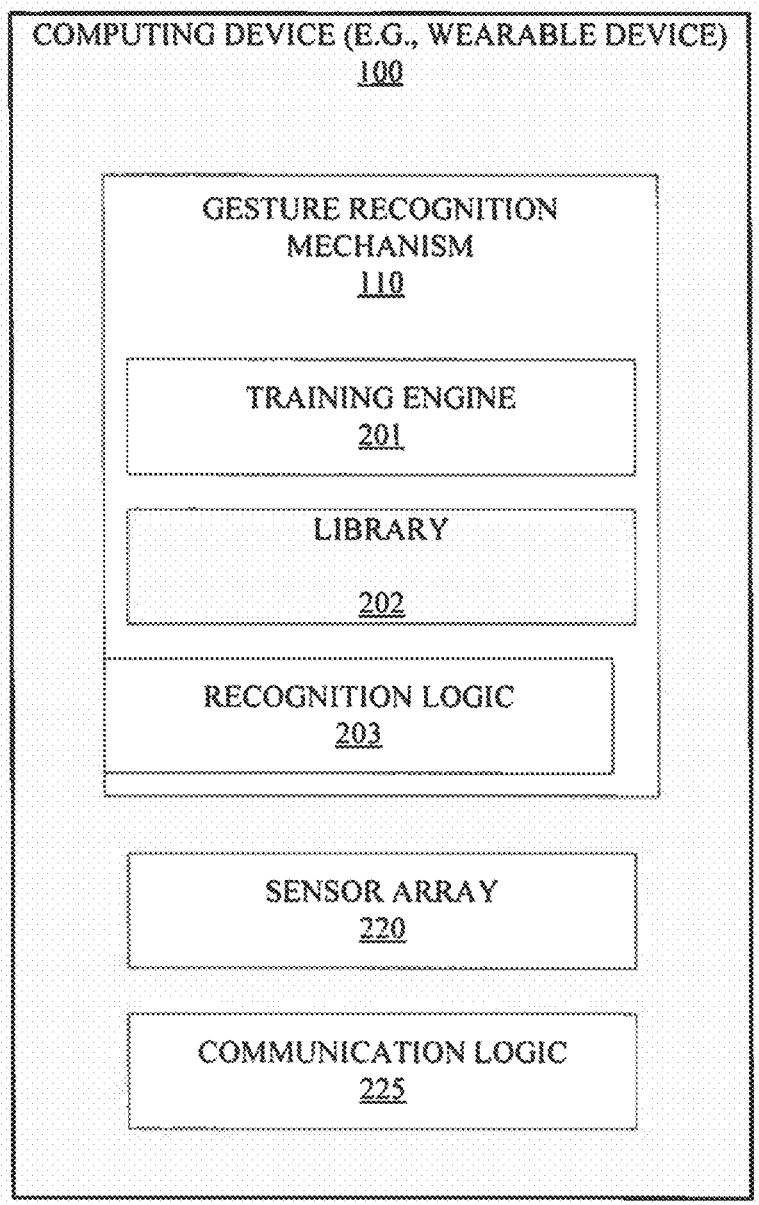
FIG. 2 illustrates one embodiment of a gesture recognition mechanism.

FIG. 2 illustrates an gesture recognition mechanism 110 employed at computing device 100. In one embodiment, gesture recognition mechanism 110 may include any number and type of components, such as: training engine 201, library 202 and recognition logic 203. In one embodiment, training engine 201 performs gestural training by implementing an algorithm that identifies the response of one or more sensors in sensor array 220 due to a body gesture without being previously aware of either a gesture (mechanical or electrical) signal waveform or the sensors (e.g., mechanical-to-electrical or electrical-to-electrical) transfer function. Accordingly, training engine 201 identifies a linear and time invariant response of each sensor to a gesture (e.g., input signal), without the previous knowledge of the gesture or the sensor's natural transfer function.

In embodiments, gesture recognition mechanism 110 receives input data from sensor array 220, where the image data may be in the form of a sequence of images or frames (e.g., video frames). Sensor array 220 may include an image capturing device, such as a camera. Such a device may include various components, such as (but are not limited to) an optics assembly, an image sensor, an image/video encoder, etc., that may be implemented in any combination of hardware and/or software. The optics assembly may include one or more optical devices (e.g., lenses, mirrors, etc.) to project an image within a field of view onto multiple sensor elements within the image sensor. In addition, the optics assembly may include one or more mechanisms to control the arrangement of these optical device(s). For example, such mechanisms may control focusing operations, aperture settings, exposure settings, zooming operations, shutter speed, effective focal length, etc. Embodiments, however, are not limited to these examples.

Image sources may further include one or more image sensors including an array of sensor elements where these elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples. For example, an image sensor converts light received through optics assembly into pixel values, where each of these pixel values represents a particular light intensity at the corresponding sensor element. Although these pixel values have been described as digital, they may alternatively be analog. As described above, the image sensing device may include an image/video encoder to encode and/or compress pixel values. Various techniques, standards, and/or formats (e.g., Moving Picture Experts Group (MPEG), Joint Photographic Expert Group (JPEG), etc.) may be employed for this encoding and/or compression.

In a further embodiment, sensor array 220 may include other types of sensing components, such as context-aware sensors (e.g., myoelectric sensors, temperature sensors, facial expression and feature measurement sensors working with one or more cameras, environment sensors (such as to sense background colors, lights, etc.), biometric sensors (such as to detect fingerprints, facial points or features, etc.), and the like.

According to one embodiment, training engine 201 extracts training responses (or eigensignals) of the gesture signals received from sensor array 220. In one embodiment, the extraction is performed by estimating cross-correlation functions from a reduced set of gesture realizations and applying a Karhunen-Loève Eigendecomposition (KLE) decomposition, wherein a training set per gesture is implemented to begin the process. In a further embodiment, the KLE process provides a criteria to select a minimum number of eigensignals to use once a predefined error is chosen. In such an embodiment, the error is user defined and is integral to the accuracy of the gesture recognition process. Once the set of eigensignals is calculated, then they are used by recognition logic 203 a the recognition stage.

Figure 3:
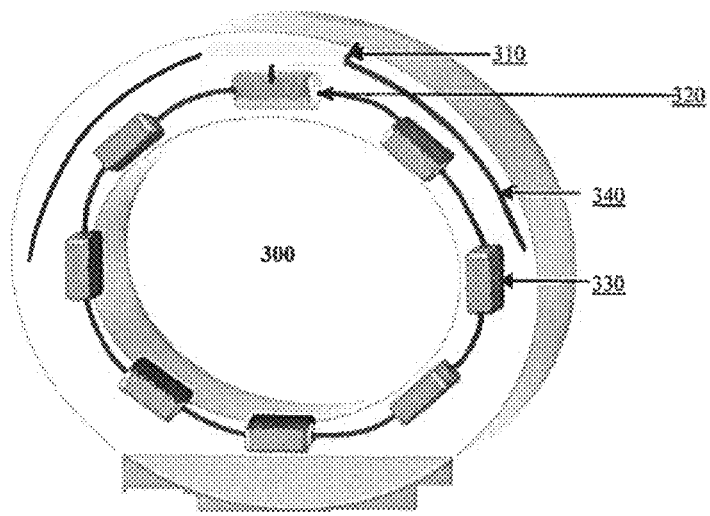
FIG. 3 illustrates one embodiment of a device.
Figures 4C, 4D:
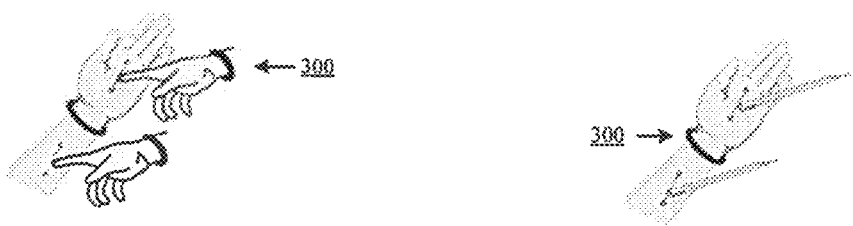
FIGS. 4A-4D illustrate embodiments of gestures implemented with a device.
Figure 4A:
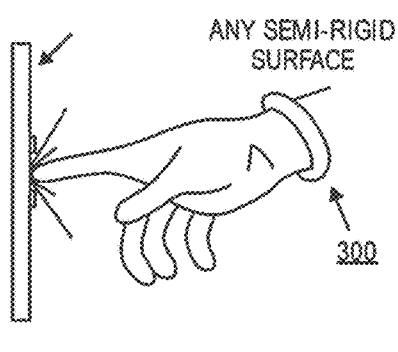
Figure 4B:
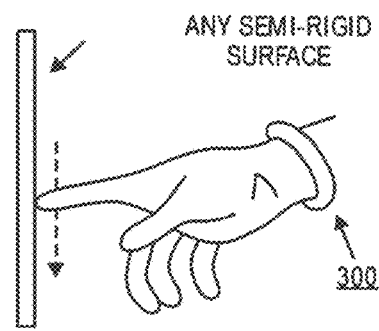

FIG. 3 illustrates one embodiment of a device 300, representative of computing device 100. In one embodiment, device 300 is a wearable device worn around the wrist of a user. Device 300 includes processor 310, battery 320, sensors (or transducers) 330 and antenna 340. FIGS. 4A-4D illustrate embodiments of gestures that may be implemented at device 300. FIG. 4A shows a user wearing device 300 performing a gesture of touching a semi-rigid surface with the index finger, while FIG. 4B shows the user performing a gesture of sliding the index finger on the semi-rigid surface in a downward manner. Meanwhile, FIGS. 4C and 4D show gestures being made to the hand/arm wearing device 300. In response to the gestures, sensors 330 transmit data to processor 310 which performs gesture recognition mechanism 110.

Figure 5:
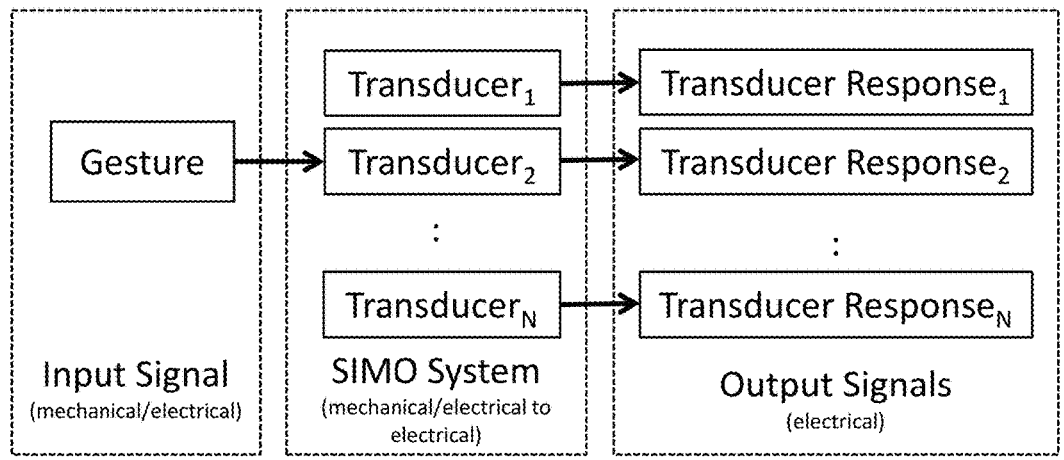
FIG. 5 illustrates one embodiment of a linear time-invariant (LTI) system.

Referring back to FIG. 2, training engine 201 extracts and processes recognition information from the sensor data responsive to the gestures. FIG. 5 illustrates one embodiment of a linear time-invariant (LTI) system implemented by training engine 201 to process the sensor data. In one embodiment, training engine 201 implements a Single-Input to Multiple-Output (SIMO) LTI system since the input data includes a single gesture and the output data corresponds to multiple sensors. From the output signals (e.g., including one set per gesture), training engine 201 synthesizes the responses of each sensor to the gesture (e.g., eigensignals) that is used by recognition logic 203 during a recognition stage. In one embodiment, the eigensignals are calculated from the bi-dimensional cross-correlation functions estimated from a number of repetitions (one per gesture) as represented by:

$$R_{p,q}(t_1,t_2)=E\{X^p(t_1)X^q(t_2)\},$$

where $X^p(t)$ represents a training signal at the output of the $p^{th}$ sensor. Further, a reduced set of orthogonal eigensignals is obtained (e.g., one per gesture) by applying the KLE process to the cross-correlation function.

Figure 6:
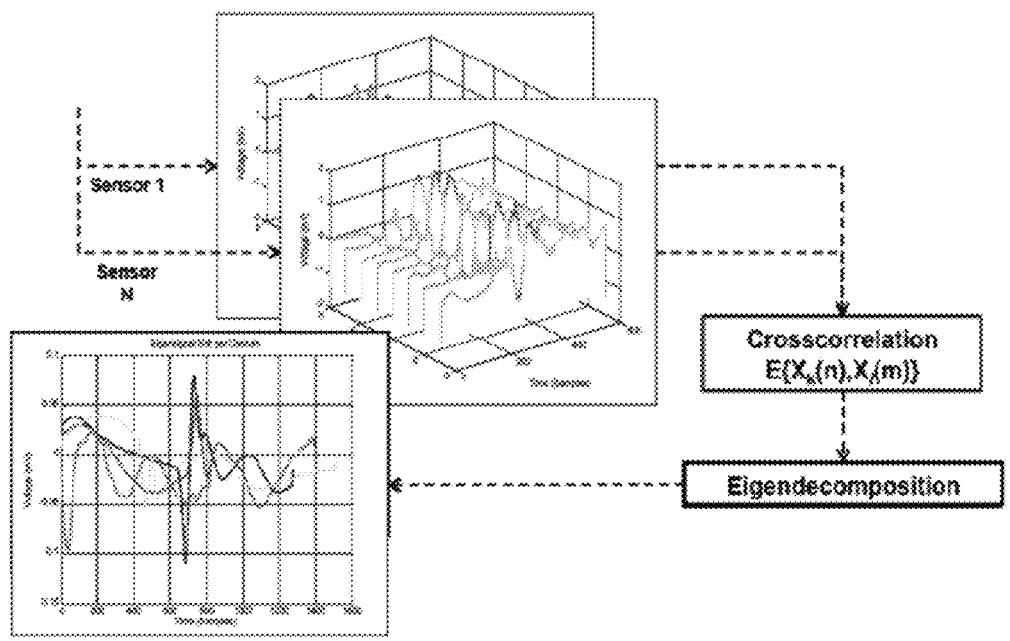
FIG. 6 is a block diagram illustrating one embodiment of a process performed by an LTI system.

FIG. 6 is a block diagram illustrating one embodiment of a process performed by the training engine 201 LTI system. For every gesture, several realizations (K) are tossed to have a representative sample of the process. At the $p^{th}$ sensor, every realization of the output signal, $\{X^p(t)\}_k=1, 2, \ldots, K,\}$ is time-aligned prior to the cross-correlations estimations (1). FIG. 6 shows the realizations in the discrete time domain rather than in the continuous time domain, i. e., t=nT, where T=1/Fs and Fs denotes the sampling frequency of the analog to digital converter. The KLE (e.g., eigendecomposition block in FIG. 6) is applied to every cross-correlation function, and is provided with a set of eigensignals, denoted as $\{\varphi_l(n)\}$, and eigenvalues, denoted as $\{\lambda_l\}$, such that $R_{p,q}=\Phi\Lambda\Phi^H$, where $\Phi$ is a matrix built as $\Phi=[\varphi_1, \varphi_2, \ldots, \varphi_L]$, $\Lambda=\text{diag}\{\lambda_1, \lambda_2, \ldots, \lambda_L\}$, L is the cardinality of the set and $(\ )^H$ denotes the Hermitian operator. In alternative embodiments, other basis such that $\Theta^H R_{p,q} \Theta$ is approximately a diagonal matrix can be used to perform gesture recognition. However, such embodiments do not perform as well as the KLE implementation.

In the KLE implementation, the cardinality of the set depends on a predefined representation error represented by:

$$E = 1 - \sum_{l=1}^{L} \lambda_l$$

Having a low representation error improves the recognition process. However, a low representation error increase the size of library 202, which may be undesirable in application with limited memory. According to one embodiment the cross-correlations process provide a less noisy measurement of the test signal responses (e.g., several realizations of the output signal are averaged together) when the output signals exhibit symmetrical additive noise PDF. Therefore the additive noise tends to its mean. In a further embodiment, a single eigensignal is typically implemented to represent a gesture per sensor.

In one embodiment, the eigensignal set is stored in library 202 for use by recognition logic 203 to perform gesture recognition. In this embodiment, recognition logic 203 implements a matched finite impulse result (FIR) filter to perform gesture recognition. In such an embodiment, a filter, ($\Psi$(n)), is used to maximize the chances for gesture recognition. Such a matched filter is an ideal signal detection criterion in the presence of additive noise with a symmetric Probability Density Function (PDF) (not necessarily Gaussian). Accordingly, form of the matched filter is proposed as:

$$\Psi(n) = \sum_{l=1}^{L} \lambda_l \phi_l(n)$$

Figure 7:
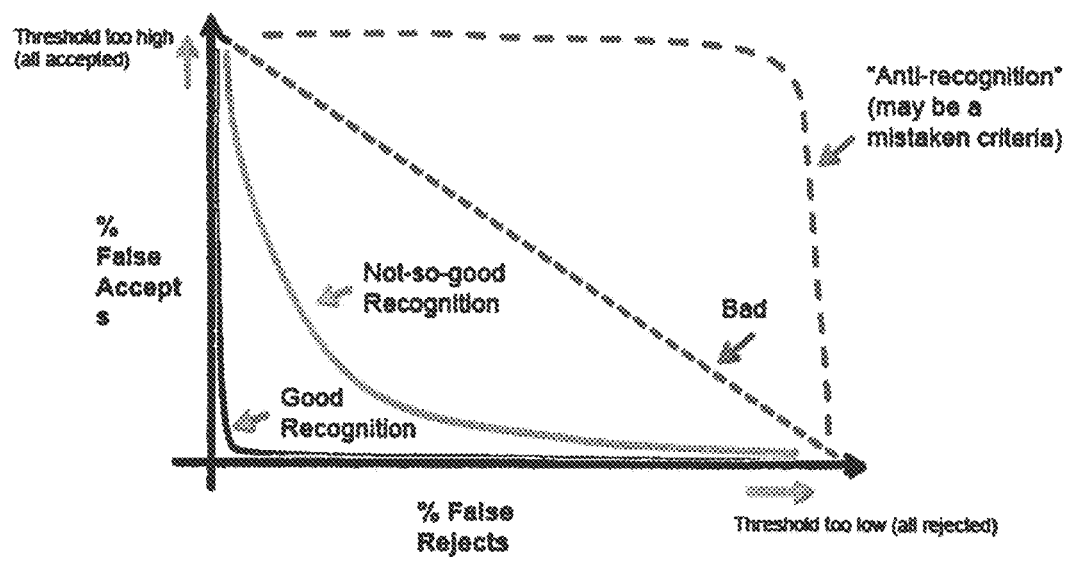
FIG. 7 illustrates one embodiment of a receiver operating characteristic curve of a gesture recognition mechanism.

FIG. 7 illustrates one embodiment of a receiver operating characteristic curve (ROC) graphical plot that illustrates the performance of gesture recognition mechanism 110 system as a discrimination threshold is varied. In one embodiment, the curve is created by plotting a fraction of false acceptance out of a total actual number of trials versus a fraction of false rejects out of a total actual negatives at various threshold settings. The performance curves are obtained by changing the threshold of acceptance at the identification stage. Recognition performance can be evaluated easily by detecting how far the curve is from the origin.

Figure 8:
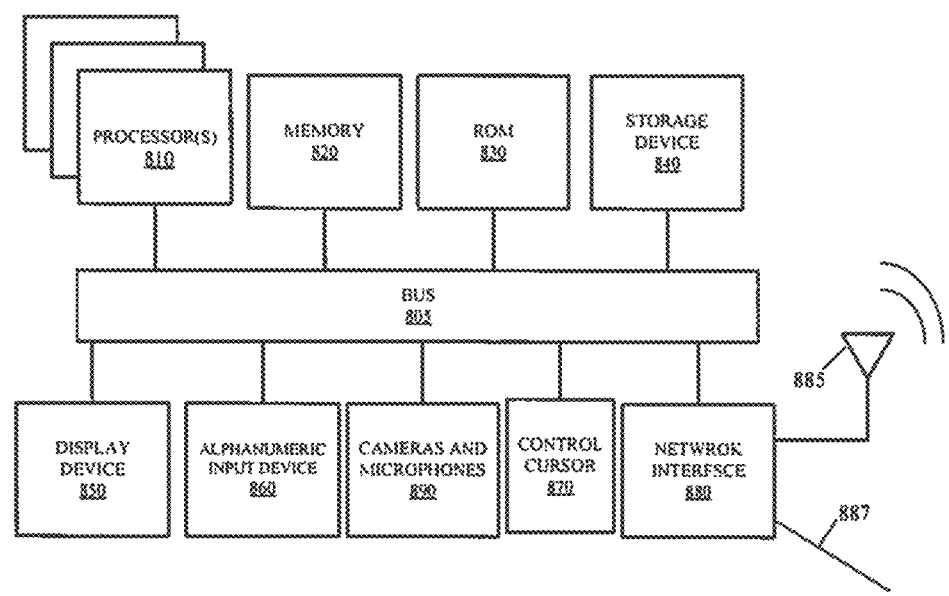
FIG. 8 illustrates one embodiment of a computer system.

FIG. 8 illustrates one embodiment of a computer system 800. Computing system 800 includes bus 805 (or, for example, a link, an interconnect, or another type of communication device or interface to communicate information) and processor 810 coupled to bus 805 that may process information. While computing system 800 is illustrated with a single processor, electronic system 800 and may include multiple processors and/or co-processors, such as one or more of central processors, graphics processors, and physics processors, etc. Computing system 800 may further include random access memory (RAM) or other dynamic storage device 820 (referred to as main memory), coupled to bus 805 and may store information and instructions that may be executed by processor 810. Main memory 820 may also be used to store temporary variables or other intermediate information during execution of instructions by processor 810.

Computing system 800 may also include read only memory (ROM) and/or other storage device 830 coupled to bus 805 that may store static information and instructions for processor 810. Date storage device 840 may be coupled to bus 805 to store information and instructions. Date storage device 840, such as magnetic disk or optical disc and corresponding drive may be coupled to computing system 800.

Computing system 800 may also be coupled via bus 805 to display device 850, such as a cathode ray tube (CRT), liquid crystal display (LCD) or Organic Light Emitting Diode (OLED) array, to display information to a user. User input device 860, including alphanumeric and other keys, may be coupled to bus 805 to communicate information and command selections to processor 810. Another type of user input device 860 is cursor control 870, such as a mouse, a trackball, a touchscreen, a touchpad, or cursor direction keys to communicate direction information and command selections to processor 810 and to control cursor movement on display 850. Camera and microphone arrays 890 of computer system 800 may be coupled to bus 805 to observe gestures, record audio and video and to receive and transmit visual and audio commands.

Computing system 800 may further include network interface(s) 880 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 880 may include, for example, a wireless network interface having antenna 885, which may represent one or more antenna(e). Network interface(s) 880 may also include, for example, a wired network interface to communicate with remote devices via network cable 887, which may be, for example, an Ethernet cable, a coaxial cable, a fiber optic cable, a serial cable, or a parallel cable.

Network interface(s) 880 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 880 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 880 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 800 may vary from implementation to implementation depending upon numerous factors, such as price constraints, performance requirements, technological improvements, or other circumstances. Examples of the electronic device or computer system 800 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate gesture recognition, comprising a sensor array to acquire sensory data, a training engine to extract training signals representing a gesture from each sensor in the sensor array during a training mode, a library to store the training signals for each signal corresponding to the gesture and gesture recognition logic to receive real time signals from the sensor array and to compare the real time output signals to corresponding training signals within the library to determine if a gesture has been recognized.

Example 2 includes the subject matter of Example 1, wherein the training engine identifies a response of each sensor in the sensor array due to the gesture without previous awareness of a signal waveform for the gesture or the sensors.

Example 2 includes the subject matter of claims 1 and 2, wherein the training engine implements a linear and time invariant (LTI) system to extract the training signals by identifying a response of each sensor to a gesture.

Example 4 includes the subject matter of Example 3, wherein the LTU system is a Single-Input to Multiple-Output (SIMO) system.

Example 5 includes the subject matter of Example 3, wherein the training engine synthetizes input signal responses of each sensor to the gesture.

Example 6 includes the subject matter of Example 5, wherein the training engine calculates the training signals from bi-dimensional cross-correlation functions estimated from a number of repetitions of the gesture.

Example 7 includes the subject matter of Example 1-6, wherein the training engine applies a Karhunen-Loève Eigendecomposition to the cross-correlation function to obtain a reduced set of orthogonal training signals.

Example 8 includes the subject matter of Example 7, wherein the recognition logic perform gesture recognition using a matched finite impulse result (FIR) filter.

Some embodiments pertain to Example 9 that includes a method to facilitate gesture recognition comprising performing gestural training to extract training signals representing a gesture from each sensor in a sensor array, storing the training signals for each signal corresponding to the gesture in a library receiving real time signals from the sensor array and comparing the real time output signals to corresponding training signals within the library to determine if a gesture has been recognized.

Example 10 includes the subject matter of Example 9, wherein performing gestural training comprises identifying a response of each sensor in the sensor array due to the gesture without previous awareness of a signal waveform for the gesture or the sensors.

Example 11 includes the subject matter of Examples 9 and 10, wherein performing gestural training comprises implementing a linear and time invariant (LTI) system to extract the training signals by identifying a response of each sensor to a gesture.

Example 12 includes the subject matter of Example 11, wherein the LTU system is a Single-Input to Multiple-Output (SIMO) system.

Example 13 includes the subject matter of Example 11, wherein performing gestural training further comprises synthetizing input signal responses of each sensor to the gesture.

Example 14 includes the subject matter of Example 13, further comprising calculating the training signals from bi-dimensional cross-correlation functions estimated from a number of repetitions of the gesture.

Example 15 includes the subject matter of Examples 10-14, further comprising applying a Karhunen-Loève Eigendecomposition to the cross-correlation function to obtain a reduced set of orthogonal training signals.

Example 16 includes the subject matter of Example 15, wherein gesture recognition is performed using a matched finite impulse result (FIR) filter.

Some embodiments pertain to Example 17 that includes at least one machine-readable medium comprising a plurality of instructions that in response to being executed on a computing device, causes the computing device to carry out the method of claims 9-16.

Some embodiments pertain to Example 18 that includes a system to facilitate gesture recognition comprising means for performing gestural training to extract training signals representing a gesture from each sensor in a sensor array, means for storing the training signals for each signal corresponding to the gesture in a library and means for receiving real time signals from the sensor array and means for comparing the real time output signals to corresponding training signals within the library to determine if a gesture has been recognized.

Example 19 includes the subject matter of Example 18, wherein the means for performing gestural training comprises implementing a linear and time invariant (LTI) system to extract the training signals by identifying a response of each sensor to a gesture.

Example 20 includes the subject matter of Example 19, wherein the means for performing gestural training further comprises synthetizing input signal responses of each sensor to the gesture.

Example 21 includes the subject matter of Example 20, further comprising means for calculating the training signals from bi-dimensional cross-correlation functions estimated from a number of repetitions of the gesture.

Example 22 includes the subject matter of Example 21, further comprising means for applying a Karhunen-Loève Eigendecomposition to the cross-correlation function to obtain a reduced set of orthogonal training signals.

Example 23 includes the subject matter of Example 18, wherein the means for gesture recognition is performed using a matched finite impulse result (FIR) filter.

Some embodiments pertain to Example 24 that includes a gesture recognition computing device comprising a sensor array to acquire sensory data, a memory device to store a library and a processor to execute a training engine to extract training signals representing a gesture from each sensor in the sensor array during a training mode and store the training signals for each signal corresponding to the gesture in the library and gesture recognition logic to receive real time signals from the sensor array and to compare the real time output signals to corresponding training signals within the library to determine if a gesture has been recognized.

Example 25 includes the subject matter of Example 24, wherein the training engine calculates the training signals from bi-dimensional cross-correlation functions estimated from a number of repetitions of the gesture.

Some embodiments pertain to Example 26 that includes at least one machine-readable medium comprising a plurality of instructions that in response to being executed on a computing device, causes the computing device to carry out operations comprising performing gestural training to extract training signals representing a gesture from each sensor in a sensor array, storing the training signals for each signal corresponding to the gesture in a library receiving real time signals from the sensor array and comparing the real time output signals to corresponding training signals within the library to determine if a gesture has been recognized.

Example 27 includes the subject matter of Example 26, wherein performing gestural training comprises implementing a linear and time invariant (LTI) system to extract the training signals by identifying a response of each sensor to a gesture.

Example 28 includes the subject matter of Example 27, wherein performing gestural training further comprises synthetizing input signal responses of each sensor to the gesture.

Example 29 includes the subject matter of Example 28, comprising a plurality of instructions that in response to being executed on a computing device, causes the computing device to further carry out operations comprising calculating the training signals from bi-dimensional cross-correlation functions estimated from a number of repetitions of the gesture.

Example 30 includes the subject matter of Example 29, comprising a plurality of instructions that in response to being executed on a computing device, causes the computing device to further carry out operations comprising applying a Karhunen-Loève Eigendecomposition to the cross-correlation function to obtain a reduced set of orthogonal training signals.

Example 31 includes the subject matter of Example 30, wherein gesture recognition is performed using a matched finite impulse result (FIR) filter.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An article of manufacture for interfacing with a user device, comprising:
   a set of transducers, each transducer having a natural transfer function capable of producing a linear and time invariant response to any of a plurality of gestures capable of being performed with a wearable interface device in which the set of transducers is contained, each gesture indicating a user interaction with a user device;
   a processor coupled to the set of transducers, the processor configured to identify the linear and time invariant response of each transducer in the set of transducers with a gesture performed with a wearable interface device without prior exposure to the gesture and the linear and time invariant response to the gesture;
   the processor coupled to non-volatile storage, the processor further configured to extract and store any one or more training eigensignals from output signals representing the linear and time invariant response of each transducer in the set of transducers, the output signals generated in response to training user interactions, wherein the any one or more training eigensignals contain information for recognizing actual user interactions equivalent to the training user interactions but exclude information about the plurality of gestures capable of being performed with the wearable interface device and any of the natural transfer functions capable of producing the linear and time invariant response to any of the plurality of gestures;

the processor further configured to extract a set of actual eigensignals from output signals generated by the set of transducers in response to the gesture performed with the wearable interface device, each actual eigensignal corresponding to one transducer in the set of transducers; and wherein the processor is further configured to recognize an actual user interaction indicated by the gesture based on one or more training eigensignals previously stored in the non-volatile storage, including to:
compare the set of actual eigensignals to the training eigensignals,
determine that the actual user interaction is equivalent to one of the training user interactions represented by training eigensignals matching any one or more of the set of actual eigensignals,
synthesize the matching eigensignals to recognize the actual user interaction indicated by the gesture performed with the wearable interface device, and
transmit an input data representing the recognized actual user interaction to the user device.

2. The article of manufacture of claim 1 wherein to extract the set of actual eigensignals from output signals, the processor is further to:
obtain a representative sample of output signals generated in response to the gesture performed with the wearable interface device;
align the representative sample of output signals by time;
estimate cross-correlation functions based on the time-aligned representative sample of output signals; and
apply an eigendecomposition to each of the estimated cross-correlation functions to compute the set of actual eigensignals from which the actual user interaction can be recognized.

3. The article of manufacture of claim 1, wherein the user interactions are gestures produced by the user in sufficient proximity to the set of transducers for generating output signals.

4. The article of manufacture of claim 1, wherein the eigendecomposition is performed using a Karhunen-Loève Eigendecomposition.

5. The article of manufacture of claim 1, wherein to compare the set of actual eigensignals to the training eigensignals is performed using a matched finite impulse result (FIR) filter.

6. A method for interacting with a user device comprising:
establishing communication with a wearable interface device having a set of transducers, each transducer having a natural transfer function capable of producing a linear and time invariant response to any of a plurality of gestures performed with the wearable interface device, each gesture indicating a user interaction with a user device;
identifying the linear and time invariant response of each transducer in the set of transducers with a gesture performed with the wearable interface device without prior exposure to the gesture and the linear and time invariant response to the gesture;
extracting training eigensignals from output signals representing the linear and time invariant response of each transducer in the set of transducers, the output signals generated in response to training user interactions, the training eigensignals containing information for recognizing actual user interactions equivalent to the training user interactions but excluding information about the plurality of gestures performed with the wearable interface device and the natural transfer function that produced the linear and time invariant response to any of the plurality of gestures performed with the wearable interface device;
storing the training eigensignals in a non-volatile storage of the wearable interface device;
extracting a set of actual eigensignals from output signals generated by the set of transducers in response to the gesture performed with the wearable interface device, each actual eigensignal corresponding to one transducer in the set of transducers; and
recognizing an actual user interaction indicated by the gesture based on one or more training eigensignals previously stored in the non-volatile storage, including:
comparing the set of actual eigensignals to the training eigensignals;
determining that the actual user interaction is equivalent to one of the training user interactions represented by training eigensignals matching any one or more of the set of actual eigensignals;
synthesizing the matching eigensignals to recognize the actual user interaction indicated by the gesture performed with the wearable interface device; and
transmitting an input data representing the recognized actual user interaction to the user device.

7. The method of claim 6, wherein extracting the set of actual eigensignals from output signals includes:
obtaining a representative sample of output signals generated in response to the gesture performed with the wearable interface device;
aligning the representative sample of output signals by time;
estimating cross-correlation functions based on the time-aligned representative sample of output signals; and
applying an eigendecomposition to each of the estimated cross-correlation functions to compute the set of actual eigensignals from which the actual user interaction can be recognized.

8. The method of claim 6, wherein the user interactions are gestures produced by the user in sufficient proximity to the set of transducers for generating output signals.

9. The method of claim 6, wherein the eigendecomposition is performed using a Karhunen-Loève Eigendecomposition.

10. The method of claim 6, wherein comparing the set of actual eigensignals to the training eigensignals is performed using a matched finite impulse result (FIR) filter.

11. At least one non-transitory machine-readable medium comprising a plurality of instructions that, in response to being executed on a computing device, cause the computing device to carry out operations comprising:
establishing communication with a wearable interface device having a set of transducers, each transducer having a natural transfer function capable of producing a linear and time invariant response to any of a plurality of gestures performed with the wearable interface device, each gesture indicating a user interaction with a user device;

identifying the linear and time invariant response of each transducer in the set of transducers with a gesture performed with the wearable interface device without prior exposure to the gesture and the linear and time invariant response to the gesture;

extracting training eigensignals from output signals representing the linear and time invariant response of each transducer in the set of transducers, the output signals generated in response to training user interactions, the training eigensignals containing information for recognizing actual user interactions equivalent to the training user interactions but excluding information about the plurality of gestures performed with the wearable interface device and the natural transfer function that produced the linear and time invariant response to any of the plurality of gestures performed with the wearable interface device;

storing the training eigensignals in a non-volatile storage of the wearable interface device;

extracting a set of actual eigensignals from output signals generated by the set of transducers in response to the gesture performed with the wearable interface device, each actual eigensignal corresponding to one transducer in the set of transducers; and recognizing an actual user interaction indicated by the gesture based on one or more training eigensignals previously stored in the non-volatile storage, including:

comparing the set of actual eigensignals to the training eigensignals;

determining that the actual user interaction is equivalent to one of the training user interactions represented by training eigensignals matching any one or more of the set of actual eigensignals;

synthesizing the matching eigensignals to recognize the actual user interaction indicated by the gesture performed with the wearable interface device; and transmitting an input data representing the recognized actual user interaction to the user device.

12. The medium of claim 11, wherein extracting the set of actual eigensignals from output signals includes:

obtaining a representative sample of output signals generated in response to the gesture performed with the wearable interface device;

aligning the representative sample of output signals by time;

estimating cross-correlation functions based on the time-aligned representative sample of output signals; and applying an eigendecomposition to each of the estimated cross-correlation functions to compute the set of actual eigensignals from which the actual user interaction can be recognized.

13. The medium of claim 11, wherein the user interactions are gestures produced by the user in sufficient proximity to the set of transducers for generating output signals.

14. The medium of claim 11, wherein the eigendecomposition is performed using a Karhunen-Loève Eigendecomposition.

15. The medium of claim 11, wherein comparing the set of actual eigensignals to the training eigensignals is performed using a matched finite impulse result (FIR) filter.

* * * * *